United States Patent
Le et al.

(10) Patent No.: US 8,244,437 B2
(45) Date of Patent: Aug. 14, 2012

(54) METHOD AND SYSTEM FOR RESTRAINT DEPLOYMENT USING LATERAL KINETIC ENERGY

(75) Inventors: Jialiang Le, Canton, MI (US); Manoharprasad K. Rao, Novi, MI (US); Todd Clark, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 362 days.

(21) Appl. No.: 12/705,793

(22) Filed: Feb. 15, 2010

(65) Prior Publication Data
US 2011/0202241 A1    Aug. 18, 2011

(51) Int. Cl.
*B60R 21/013* (2006.01)
(52) U.S. Cl. .................... 701/46; 280/735; 340/436
(58) Field of Classification Search .............. 701/45–47; 280/735; 340/436
See application file for complete search history.

(56) References Cited

U.S. PATENT DOCUMENTS

| | | | |
|---|---|---|---|
| 6,654,671 B2 * | 11/2003 | Schubert ........................... 701/1 |
| 6,856,868 B1 | 2/2005 | Le et al. | |
| 7,165,008 B2 | 1/2007 | Choi | |
| 7,460,937 B2 | 12/2008 | Lahmann et al. | |
| 7,522,982 B2 * | 4/2009 | Le et al. ........................... 701/45 |
| 7,702,440 B2 * | 4/2010 | Wu et al. ......................... 701/45 |
| 8,014,922 B2 * | 9/2011 | Le et al. ........................... 701/45 |
| 2006/0058934 A1 * | 3/2006 | Le et al. ........................... 701/38 |
| 2006/0178808 A1 | 8/2006 | Wu et al. | |
| 2006/0190176 A1 | 8/2006 | Gleacher et al. | |
| 2008/0201042 A1 | 8/2008 | Cuddihy et al. | |
| 2008/0208413 A1 | 8/2008 | Willig et al. | |
| 2008/0243335 A1 | 10/2008 | Rao et al. | |
| 2010/0198446 A1 * | 8/2010 | Erb et al. ......................... 701/29 |

FOREIGN PATENT DOCUMENTS
WO    2008048159 A1    4/2008

OTHER PUBLICATIONS

PRISM, WP1: Task 1.1: State of the Art and Patent Search, Proposed Reduction of Car Crash Injuries Through Improved Smart Restraint Development Technologies, Feb. 2005.

* cited by examiner

*Primary Examiner* — Paul N Dickson
*Assistant Examiner* — Timothy Wilhelm
(74) *Attorney, Agent, or Firm* — Frank A. MacKenzie; Brooks Kushman P.C.

(57) ABSTRACT

A safety system for a motor vehicle has a yaw rate sensor for detecting a yaw rate of the vehicle and impact sensors for detecting a side impact. A control module calculates a lateral kinetic energy of the vehicle if the yaw rate exceeds a threshold value, and an occupant restraint is activated based upon the lateral kinetic energy and signals from the side impact sensors. The disclosed system and method provide for improved restraint deployment decisions when a vehicle has a lateral velocity associated with a high yaw rate, as may be the case during a spin or a skid.

20 Claims, 2 Drawing Sheets

METHOD AND SYSTEM FOR RESTRAINT DEPLOYMENT USING LATERAL KINETIC ENERGY

BACKGROUND

1. Technical Field

The present invention relates generally to automotive vehicles having occupant restraint systems, and more particularly to an occupant restraint system able to detect and activate restraints during a side impact.

2. Background Art

Modern automotive vehicles typically include occupant protection systems having deployable restraints such as airbags, side air curtains, active head restraints, and seatbelt pretensioners. Such occupant protection systems should ideally be able to protect vehicle occupants from injury during both frontal collisions and side impacts. It is known to equip a vehicle with side impact sensors located at side crash zones. Side impact sensors may include accelerometers (also known as g-sensors) and/or air pressure sensors located inside a door or other cavity of the vehicle body. When a side impact is detected, appropriate occupant restraints such as seatbelt pretensioners, side airbags, and/or inflatable side curtains are deployed.

During some side impact conditions, such as when the vehicle is traveling sideways and strikes a stationary pole, traditional safety systems using the side impact sensors alone to detect the impact may not produce a reliable indication early enough in the event to allow optimum deployment of occupant restraints.

SUMMARY

A disclosed safety system for a motor vehicle comprises an active safety system; a dynamics sensor detecting a yaw rate of the vehicle; a control module operating in an active safety mode if the yaw rate is below a threshold value and changing operation to a crash-imminent mode if the yaw rate reaches the threshold value, the crash-imminent mode comprising calculating a vehicle lateral kinetic energy; an impact sensor detecting a side impact; and an occupant restraint activated based upon the lateral kinetic energy and signals from the impact sensor. The disclosed system provides for improved restraint deployment decisions when a vehicle has a lateral velocity associated with a high yaw rate, as may be the case during a spin or a skid.

According to another feature of the disclosed system, the control module calculates the lateral kinetic energy by performing an integration of a measured lateral acceleration of the vehicle, and the integration is performed using initial conditions existing at time when the yaw rate exceeds the threshold value. This minimizes the length of time prior to a side impact over which the integration is performed, thereby reducing accumulated sensor or mathematical errors.

According to another feature of the disclosed system, the active safety mode comprises determining vehicle dynamic state variables at a first refresh rate, and the crash-imminent mode comprises determining vehicle dynamic state variables at a second refresh rate, the second refresh rate being faster than the first refresh rate. This allows the active safety systems to receive and process data at a refresh rate appropriate for their operation up until a crash is considered imminent, at which time the refresh rate is increased to a rate more appropriate for occupant restraint systems.

According to another embodiment of the disclosed system, acceleration data is processed at a first range of values prior to the wake-up time for use by the active safety system, and acceleration data is processed at a second range of values after the wake-up time for use by the control module, the second range being higher than the first range.

A method is disclosed comprising operating a dynamics sensor of a motor vehicle to detect a yaw rate of the vehicle; if the yaw rate exceeds a threshold value, calculating a lateral kinetic energy of the vehicle; operating an impact sensor to detect a side impact; and using the lateral kinetic energy and outputs from the impact sensor to control an occupant restraint. The disclosed method provides for improved restraint deployment decisions when a vehicle has a lateral velocity associated with a high yaw rate, as may be the case during a spin or a skid.

BRIEF DESCRIPTION OF THE DRAWINGS

Embodiments of the present disclosure will now be described by way of example only with reference to the accompanying drawings in which.

DETAILED DESCRIPTION

Figure 1:
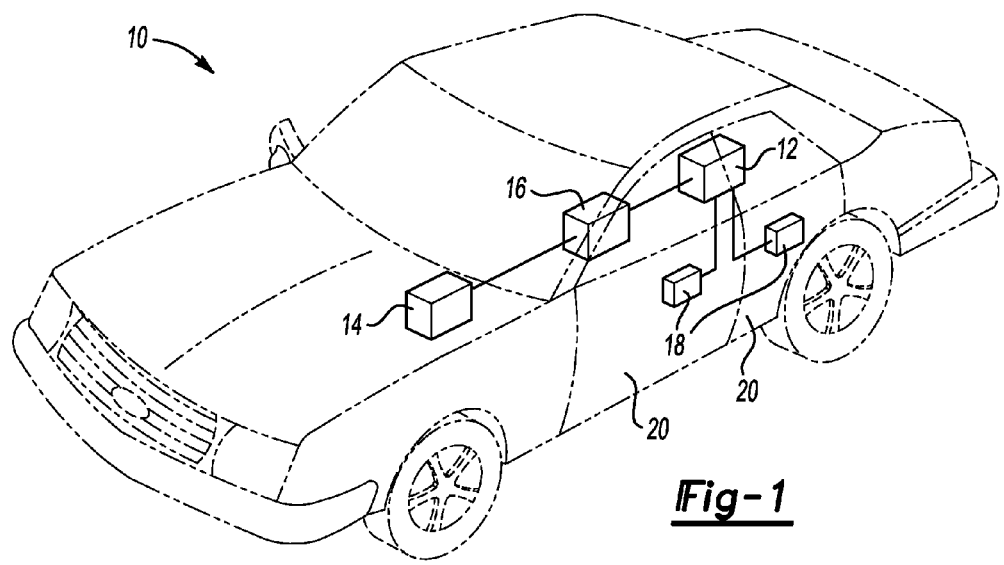
FIG. 1 is a general schematic depiction of an automotive vehicle equipped with an occupant safety system according to an embodiment of the invention.

FIG. 1 depicts in simplified schematic form an automotive vehicle 10 having a restraints control module (RCM) 12 and an active safety control module (ASCM) 14. An inertial measurement unit (IMU) 16 generates signals used in determining the dynamic state variables that indicate or describe the dynamic state of the vehicle. The signals from IMU 16 are used by both RCM 12 and ASCM 14. Side impact sensors 18 are located in, on, or adjacent to vehicle doors 20.

Figure 2:
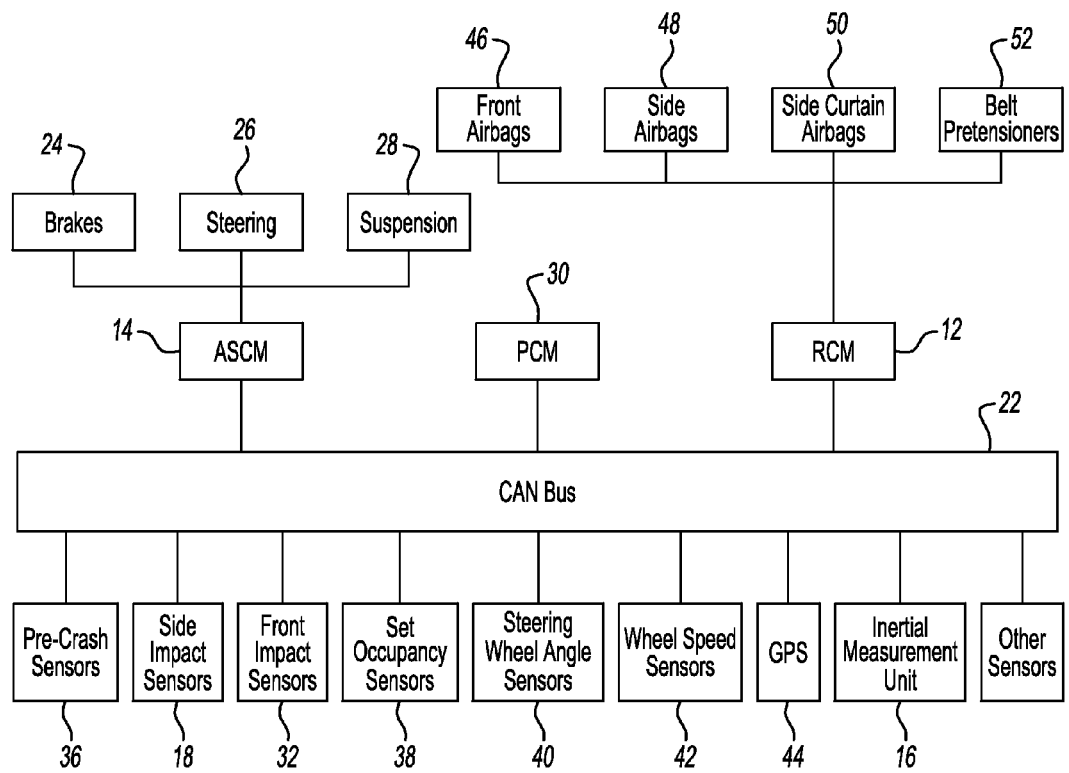
FIG. 2 is a system block diagram of an automotive vehicle safety system according to an embodiment of the invention.

Referring to FIG. 2, an example of a vehicle safety system in accordance with one embodiment of the invention includes an RCM 12 and an ASCM 14. One or both of control modules 12, 14 may, as is well known in the vehicle electronics art, be microprocessor-based devices such as a computer having a central processing unit, memory (RAM and/or ROM), and associated input and output buses. The controller may be an application-specific integrated circuit or other logic devices known in the art.

The modules 12, 14 and other components of the safety system may be, as is well known in the art, interconnected by a high-speed data bus 22. Examples of such a data bus currently used in the automotive industry are the Controller Area Network (CAN) bus, Local Interconnect Network (LIN), and Flex Ray. An electronic data protocol suitable for the specific type of data bus is used for the electronic signals passed between the modules.

RCM 12 receives input signals from various sensors and driver-actuated controls, applies pre-programmed logic and algorithms to determine when a collision with another object is impending or has occurred and activates and/or deploys passive safety systems, such as occupant restraints, as appropriate to protect occupants of the vehicle during the collision.

In general, ASCM 14 receives input signals from sensors and driver-actuated controls, applies pre-programmed logic and algorithms to detect or predict unsafe/undesired vehicle dynamic behavior (such as skidding, wheel spin, excessive or uncommanded yaw or body roll, rollovers, understeer, and oversteer), and intervenes in the operation of chassis systems (for example, brakes 24, steering 26, and suspension 28 to minimize such undesired dynamic behavior and allow the driver to maintain control of the vehicle. ASCM 14 may also control powertrain systems via a powertrain control module (PCM) 30. ASCM 14 may implement known active safety control functions such as anti-lock braking, traction-control, yaw stability control, and/or roll stability control systems.

Among the various sensors that may provide signals to RCM 12 and/or ASCM 14 are forward impact sensors 32, side impact sensors 18, pre-crash sensors 36 (radar, lidar, ultrasonic, optical, etc.), and seat occupancy sensors 38. Other sensors that may include a steering wheel angle sensor 40, wheel speed/spin sensors 42, and a Global Positioning System (GPS) sensor 44.

The term Inertial Measurement Unit or IMU usually refers to a device able to detect linear and angular accelerations in/about all three axes of the vehicle. Dynamics sensors such as other types of single- or multi-axis accelerometers (not shown) may be used rather than a six degrees-of-freedom IMU. Measured accelerations may, as is well known in the art, be mathematically integrated to calculate vehicle velocities, positions, and/or orientations.

Side impact sensors 18 are usually located in or on the vehicle structure adjacent side crash zones of the vehicle. The side crash zones may be generally defined as the areas adjacent the occupant seating positions on either side of the vehicle. Side impact sensors 18 are known to include both accelerometers (g-sensors) and air pressure sensors located within a vehicle cavity, such as the interior of a door, to detect crushing caused by the impact.

Occupant restraints controlled by RCM 12 may include front airbags 46, side impact airbags 48, side curtain airbags 50, and seatbelt pretensioners 52 associated with one or more seating positions. Seatbelt pretensioners 52 operate to eliminate slack in a lap and/or shoulder belt prior to a collision event. Other occupant protection systems may be interfaced with RCM 12, for example, but not limited to, active head restraints, knee or leg bolsters, or inflatable seatbelts (not shown).

It will be apparent to one of skill in the vehicle electronics arts that FIG. 2 is but one of many possible system architectures that may be used to effect monitoring and control of the various systems as disclosed herein. The disclosed functionality may be distributed differently among one or more of the various control modules and remain within the scope of the invention. Similarly, the functions of any of the sensors may be performed by a combined sensor module or by any number of multi-function sensors and/or sensor modules.

Figure 3:
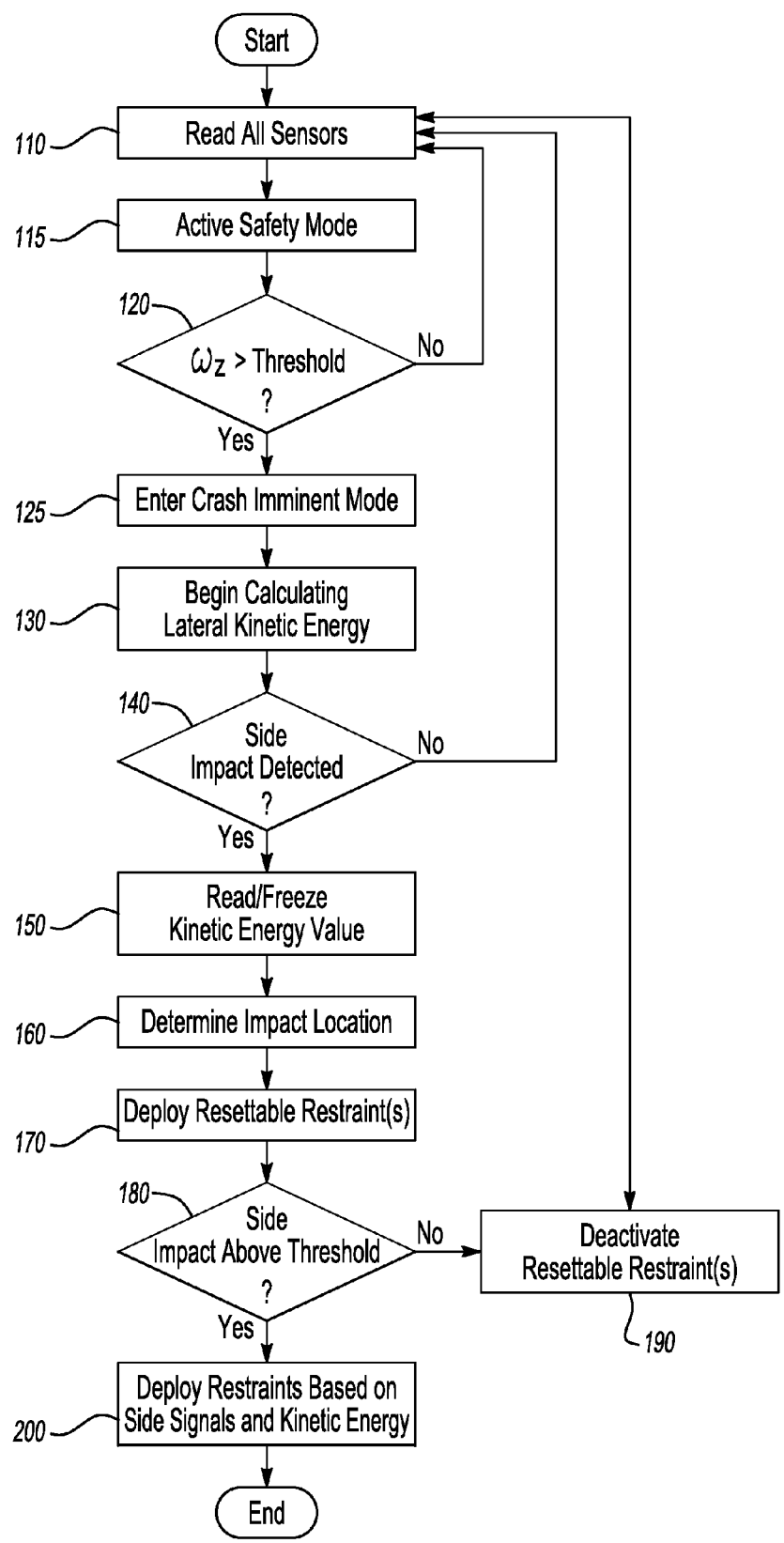
FIG. 3 is a simplified flow diagram of a method for implementing a restraint deployment algorithm according to an embodiment of the invention.

FIG. 3 shows, in flow chart form, a method according to an embodiment of the present disclosure. The described method focuses on detecting a side impact condition and activating vehicle occupant restraints in response to such a condition. It will be understood by a person of skill in the art that the flow chart steps discussed and shown may also interface with steps of other routines related to other aspects of the occupant safety system and/or the active safety systems of the vehicle.

At block 110, all available sensor signals are used to determine the dynamic state variables which describe the dynamic state of the vehicle and the driver's intentions, and to operate one or more active safety control systems. At block 115, the system is operating in an active safety mode in which sensors are operated and/or signals are processed in a manner adapted for proper control of the appropriate active safety systems. Crash and pre-crash sensors are also monitored to determine whether a crash has occurred or is imminent. These sensors include all those discussed above in relation to FIG. 2. A particular vehicle may not include all of the sensors discussed, but there should be the ability to measure, derive, or estimate the yaw angular velocity ($\omega_z$), hereinafter referred to as yaw rate, based on signals from one or more sensors.

At block 120, the yaw rate $\omega_z$ is compared with a threshold value that is selected to indicate that the vehicle is making an unusually abrupt maneuver that may be uncommanded and/or undesired. As long as the value of $\omega_z$ remains below the threshold value (block 120, NO), the algorithm does not proceed to block 125 and so the vehicle safety system continues to operate in the active safety mode.

When yaw rate $\omega_z$ exceeds the threshold value, the method advances to block 125 and one or more of the system sensors and/or modules enter a crash-imminent mode wherein the signals are measured and/or processed in a manner adapted for proper control of passive safety systems such as occupant restraints. This transition from the active safety operating mode to the crash-imminent mode is referred to as "system wake-up," and the time at which the transition occurs is referred to as the "wake-up time."

In the crash-imminent mode, for example, the data refresh rate of some system components may increase from a relatively slow rate appropriate for operation of the active safety systems (such as yaw or roll stability control) to a faster refresh rate better adapted to accurate and timely control of restraints by RCM 12. For example, IMU 16 may operate at refresh rate of 20 milliseconds when in active safety mode, changing to a refresh rate of 0.5 milliseconds in the crash-imminent mode.

As another example, system wake-up may involve a change in the range of sensor readings measured and/or processed by the safety system or sub-systems. For example, in the active safety mode ASCM 14 may require relatively low maximum vehicle acceleration readings (from IMU 16, for example) of approximately 1.7 g to properly control the active safety systems. In the crash-imminent mode, RCM 12 may require higher maximum acceleration readings to accurately detect a collision and deploy occupant restraints in an effective manner. Consequently, in the crash-imminent mode the range of the sensors should expand and/or shift upwardly to an appropriate range (maximum reading of approximately 150 g, for example).

Transition from the active safety mode to the crash-imminent mode may involve utilizing a single sensor (or set of sensors) able to operate in either of the two modes as required. The transition may also be achieved by utilizing two separate sensors (or sets of sensors), one for each of the two modes. These two alternatives may be combined in the safety system of a vehicle as necessary depending on the system architecture and available sensors.

Advancing to block 130, a controller (RCM 12, ASCM 14, or some other control device) begins calculating the lateral kinetic energy, $KE_y$, of the vehicle. $KE_y$ may be calculated using a calculated or estimated vehicle lateral velocity, $v_y$. If the vehicle lateral velocity is derived by integrating measured/estimated values of vehicle lateral acceleration, it is generally advantageous to begin the integral calculation at a point in time as close to the moment of side impact as possible. The short time of integration reduces the possibility for accumulated calculation errors, sensor misalignment errors, electrical errors, etc., and so gives a more accurate result.

Since initial conditions are established at the wake-up time to begin the integration of lateral and longitudinal accelerations, it may be convenient to assume that the initial longitudinal velocity is equal to the vehicle speed as measured by the speedometer or other device with which velocity can be estimated. As an initial condition, lateral velocity may be assumed to be zero.

When a side collision is detected (block 140, YES), the method progresses to block 150 and the lateral kinetic energy $KE_y$ at the instant of the side impact detection is determined based on output from the appropriate sensors. Progressing to block 160, the location(s) and direction of the impact is determined as accurately as possible using all available sensors. At block 170, one or more resettable restraints may be deployed. Resettable restraints are those restraints that may be activated multiple times without any degradation to the safety system. That is, they may be activated based on an impact threat, reset to a non-activated condition if/when no longer needed, then subsequently activated a second time if needed. Belt pretensioners are an example of a resettable restraint. Only resettable restraints are deployed initially, since the severity of the impact has not yet been established and non-resettable restraints (such as airbags) may not be required, or the optimum time for activation of non-resettable restraints has not yet arrived.

At block 180, the magnitude/severity of the side impact is determined and compared with a threshold value. The threshold value may be based upon any single or combination of measureable indications. If the magnitude/severity is below the threshold (block 180, NO), any resettable restraints that had been deployed may be reset to the deactivated condition at block 190, and the method returns to block 110.

If the side impact magnitude/severity exceeds the threshold (block 180, YES), other appropriate occupant restraints, such as one or more of airbags 46, 48 and 50 are deployed, block 200. The deployment control is based on at least the following two components: 1) signals received from side impact sensors 18; and 2) the vehicle lateral kinetic energy at the time of impact. Deployment control decisions made by RCM 12 may include both the timing of deployment of the restraints and, if applicable, the mode of deployment. For example, some airbags have two or more stages of deployment depending upon the severity and/or timing of an impact.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

What is claimed:

1. A method comprising:
    operating a safety system of a vehicle in an active safety mode;
    comparing a vehicle yaw rate with a threshold value;
    if the yaw rate exceeds the threshold value, changing operation of the safety system to a crash-imminent mode and calculating a vehicle lateral kinetic energy;
    operating an impact sensor to detect a side impact; and
    using the lateral kinetic energy and output from the impact sensor to control an occupant restraint.

2. The method according to claim 1 wherein the active safety mode comprises determining vehicle dynamic state variables at a first refresh rate, and the crash-imminent mode comprises determining vehicle dynamic state variables at a second refresh rate, the second refresh rate being faster than the first refresh rate.

3. The method according to claim 1 wherein the active safety mode comprises utilizing sensor signals in a first range of values, and the crash-imminent mode comprises utilizing sensor signals in a second range of values, the second range being higher than the first range.

4. The method according to claim 1 wherein calculating the lateral kinetic energy comprises performing an integration of a measured lateral acceleration of the vehicle, and the integration is performed using initial conditions existing at a time when the yaw rate exceeds the threshold value.

5. The method according to claim 1 wherein the yaw rate is determined by an inertial measurement unit.

6. The method according to claim 1 wherein the occupant restraint is a non-resettable restraint, and further comprising activating a resettable occupant restraint prior to activation of the non-resettable restraint.

7. The method according to claim 1 wherein the calculating the lateral kinetic energy and the controlling the activation of the occupant restraint are performed by a single control module.

8. The method according to claim 1 wherein the impact sensor is an accelerometer.

9. The method according to claim 1 wherein the impact sensor is an air pressure sensor disposed within a vehicle cavity.

10. A method of operating a safety system of a vehicle comprising:
    generating signals indicating a dynamic state of the vehicle including a yaw rate and a lateral acceleration;
    operating at least one active safety control system in an active safety mode using at least some of the signals;
    comparing the yaw rate with a threshold value;
    if the yaw rate exceeds the threshold value, entering a crash-imminent mode adapted for optimum control of passive safety systems, the crash-imminent mode including calculating a lateral kinetic energy of the vehicle using at least some of the signals;
    operating an impact sensor to detect a side impact; and
    using the lateral kinetic energy and output from the impact sensor to control an occupant restraint.

11. The method according to claim 10 wherein the active safety mode comprises determining vehicle dynamic state variables at a first refresh rate, and the crash-imminent mode comprises determining the vehicle dynamic state variables at a second refresh rate, the second refresh rate being faster than the first refresh rate.

12. The method according to claim 10 wherein the active safety mode comprises utilizing sensor signals in a first range of values, and the crash-imminent mode comprises utilizing sensor signals in a second range of values, the second range being higher than the first range.

13. The method according to claim 10 wherein the occupant restraint is a non-resettable restraint, and further comprising activating a resettable occupant restraint prior to activation of the non-resettable restraint.

14. A safety system for a motor vehicle comprising:
    an active safety system;
    a dynamics sensor detecting a vehicle yaw rate;
    at least one control module operating in an active safety mode if the yaw rate is below a threshold value and changing operation to a crash-imminent mode if the yaw rate reaches the threshold value, the crash-imminent mode comprising calculating a vehicle lateral kinetic energy;

an impact sensor detecting a side impact; and an occupant restraint activated based upon the lateral kinetic energy and signals from the impact sensor.

15. The apparatus according to claim 14 wherein the control module calculates the lateral kinetic energy by performing an integration of a measured lateral acceleration of the vehicle, and the integration is performed using initial conditions existing at a time when the yaw rate exceeds the threshold value.

16. The apparatus according to claim 14 wherein the active safety mode comprises determining vehicle dynamic state variables at a first refresh rate, and the crash-imminent mode comprises determining vehicle dynamic state variables at a second refresh rate, the second refresh rate being faster than the first refresh rate.

17. The apparatus according to claim 14 wherein the active safety mode comprises utilizing sensor signals in a first range of values, and the crash-imminent mode comprises utilizing sensor signals in a second range of values, the second range being higher than the first range.

18. The apparatus according to claim 14 wherein the dynamics sensor is an inertial measurement unit.

19. The apparatus according to claim 14 wherein the occupant restraint is a non-resettable restraint and further comprising a resettable occupant restraint activated prior to activation of the non-resettable restraint.

20. The apparatus according to claim 14 wherein the control module further controls the activation of the occupant restraint.

* * * * *